United States Patent [19]
Orlowski

[11] Patent Number: 5,378,000
[45] Date of Patent: Jan. 3, 1995

[54] SHAFT SEAL ASSEMBLY
[75] Inventor: David C. Orlowski, Milan, Ill.
[73] Assignee: Inpro Companies, Inc., Rock Island, Ill.
[21] Appl. No.: 962,946
[22] Filed: Oct. 19, 1992
[51] Int. Cl.[6] ............................................ F16J 15/447
[52] U.S. Cl. ........................................ 277/25; 277/53; 277/174
[58] Field of Search .................. 277/25, 53, 55, 56, 277/57, 174, 177, 226; 384/135, 480, 488, 489, 478

[56] References Cited

U.S. PATENT DOCUMENTS

| | | | |
|---|---|---|---|
| 3,094,335 | 6/1963 | Shenk | 277/174 X |
| 3,586,289 | 6/1971 | Priese | 277/144 X |
| 4,534,239 | 8/1985 | Heimann | 277/24 X |
| 4,703,937 | 11/1987 | Chrzanowski | 277/177 X |
| 4,743,034 | 5/1988 | Kakabaker et al. | 277/53 |
| 4,890,941 | 1/1990 | Calafell, II et al. | 277/53 X |
| 4,989,883 | 2/1991 | Orlowski | 277/25 |
| 5,069,461 | 12/1991 | Orlowski | 277/25 |
| 5,078,410 | 1/1992 | Warman et al. | 277/25 |
| 5,181,728 | 1/1993 | Stec | 277/53 |
| 5,221,095 | 6/1993 | Orlowski | 277/25 X |

Primary Examiner—William A. Cuchlinski, Jr.
Assistant Examiner—John L. Beres
Attorney, Agent, or Firm—Rockey, Rifkin & Ryther

[57] ABSTRACT

The improved shaft seal assembly is disclosed in having the sealing device lodged simultaneously in a female recess in the rotor and stator. The mating relationship of a solid deformable annular seal in opposed recesses in the stator and the rotor results in the rotor and stator being locked together thus preventing axial movement between the rotor and stator. The novel seal assembly will be a positive seal during operation and also will prevent leakage when at rest.

12 Claims, 2 Drawing Sheets

SHAFT SEAL ASSEMBLY

BACKGROUND OF THE INVENTION

This invention relates generally to shaft sealing devices for use with rotating equipment. Adequate maintenance of rotating equipment is difficult to obtain because of extreme equipment duty cycles, the lessening of service factors, design and the lack of spare rotating equipment in many processing plants.

Various forms of shaft sealing devices have been utilized to try to protect the integrity of the bearing environment including rubber lip seals, clearance labyrinth seals, and attraction magnetic seals. Lip seals or O-ring shaft seals can quickly wear out and fail and are also known to permit excessive amounts of moisture and other contaminants into the oil reservoir of the operating equipment even before failure.

Labyrinth-type seals involving closely related stator and rotor rings, which do not contact each other but define labyrinth passages between them have been devised and utilized and are illustrated in Orlowski, U.S. Pat. Nos. 4,706,968; 4,989,883; 5,069,461; and the additional patents to Orlowski cited therein. As described in Orlowski U.S. Pat. Nos. 4,989,883 and 5,069,461, improvements in labyrinth seals are disclosed including the utilization of various forms of O-ring seals to improve the static sealing action when the shaft is at rest and non-contact dynamic sealing action when the shaft is rotating.

SUMMARY OF THE INVENTION

An objective of the present invention is to provide a seal around rotating shafts and between the housing and the shaft to prevent leakage of lubricant and the entry of contaminants by the use of an annular ring seal contained within a novel cavity in the stator and rotor.

The prior art seals utilizing O-ring members have provided contact with both the stator and rotor when the shaft is at rest but which disengaged from the stator when the shaft rotates at normal operating speed.

Prior art sealing mechanisms, utilizing labyrinth and seals, have normally provided a female recess in the rotor and a male surface or projection on the stator. This invention relates to improving the sealing device by having the seal in a recess or female surface on both the rotor and the stator. This invention provides also a novel means of inserting the sealing ring into recesses or cavities in the stator and rotor whereby once assembled, the stator and rotor are locked together in the axial direction because the walls of the cavities intersect the seal at or about its center line. To separate the rotor and stator, it requires that the O-ring seal be sheared. This positive axial lock provides many advantages not found in prior art sealing devices. This lock-up prevents axial separation of the rotor/stator when axial adjustments on certain centrifugal process pumps are made or other axial movements or alignments of the shaft are required or made.

This novel bearing isolator also has the ability to withstand differential pressures found in oil mist lubrication containment systems. The bearing isolator of this invention will also accommodate and operate successfully with elevated oil levels such as those encountered in machine tool spindles operating at an attitude other than horizontal.

To accomplish this, the isolator mechanism comprises a stator ring affixed to the housing and a rotor ring attached to the shaft as is normal in such seals. The stator and rotor have female recesses or cavities opposing each other and a solid, yet circumferentially deformable, annular seal member mounted in said recesses or cavities.

Other objects, advantages, and embodiments of the invention will become apparent upon reading the following detailed description and upon reference to the drawings and to the prior art patents.

DETAILED DESCRIPTION OF THE PREFERRED EMBODIMENT OF THE INVENTION

Figure 1:
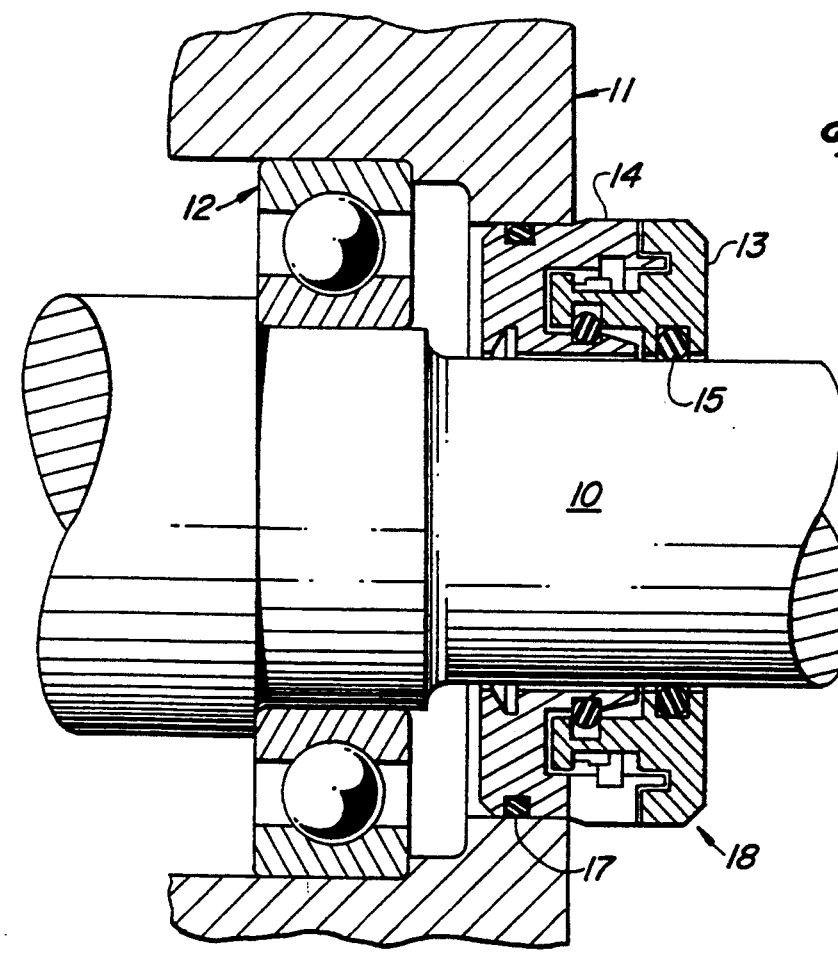
FIG. 1 is a sectional view showing the improved sealing structure with a shaft.
Figure 2:
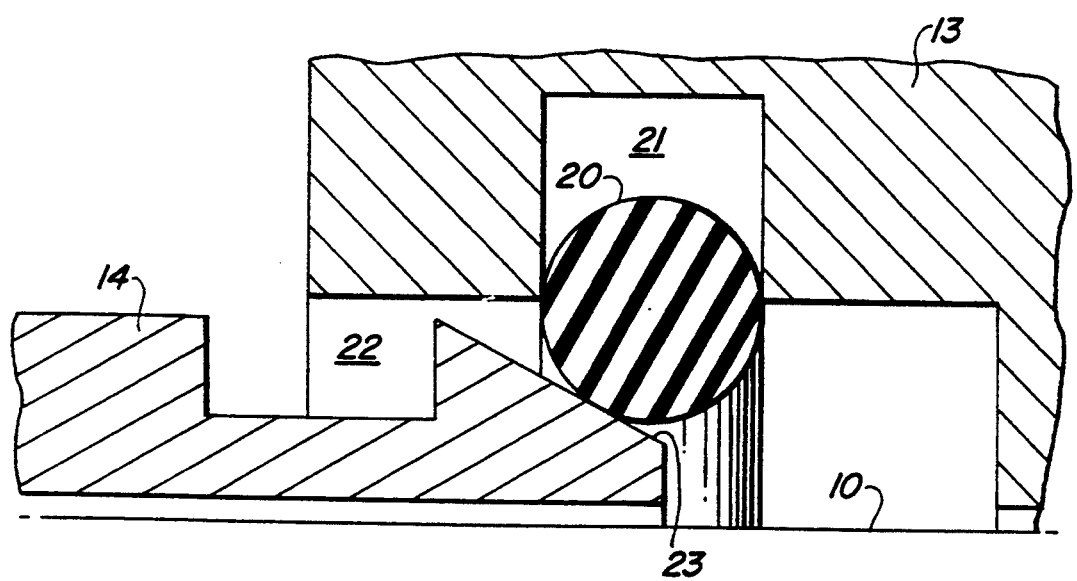
FIG. 2 is a sectional view showing in detail the assembly of the sealing ring into the cavities of the rotor and stator.

Referring first to FIG. 1. There is shown the bearing isolator including a novel seal of this invention mounted on shaft 10. The shaft 10 protrudes through the isolator 18 and the housing 11 and the bearing 12. The novel isolator of this invention is shown with the stator 14 and the seal 17 holding the isolator 18 in position. The rotor ring 13 is affixed to the shaft by means of the frictional seal 15. The rotor ring follows the rotational movement of the shaft 10 because of the frictional engagement of the seal 15. The labyrinths and passages are substantially as shown in FIG. 1 but will not be described in detail herein because such description is readily available and found in the referenced patents. Such description is specifically found in U.S. Pat. No. 5,069,461, column 3, lines 21–64.

Figure 3:
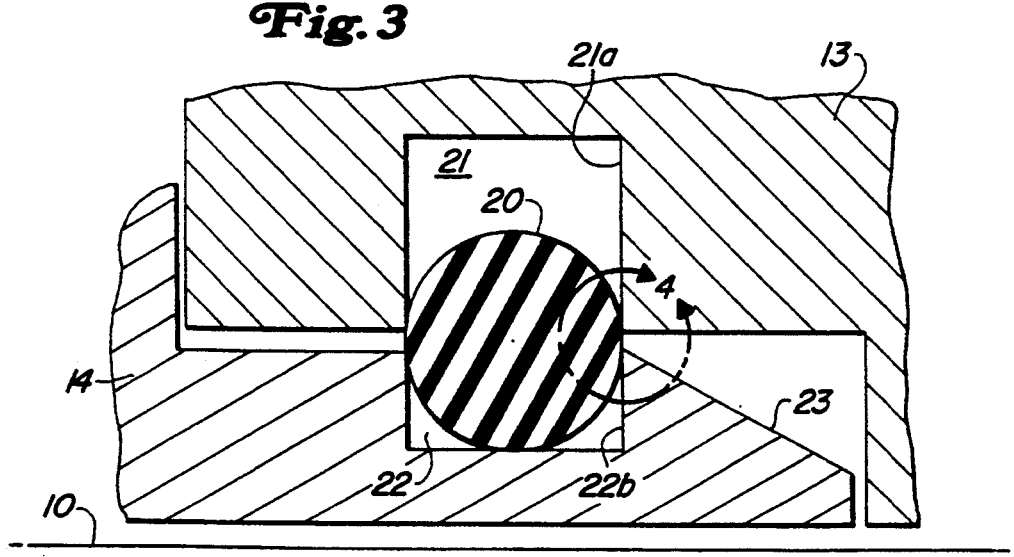
FIG. 3 is a sectional view of the O-ring in position during rest in the cavities of the stator and rotor.

The novelty of this invention is shown in FIG. 1 but is best described by reference to FIGS. 2, 3, 4, and 5. As shown, there is a female or recess or cavity portion in both the stator and rotor. The recesses are generally rectangular in shape and are denoted by the reference numerals 21 and 22. In these cavities as shown in FIG. 3, is inserted a solid, yet circumferentially resilient, sealing member 20; said sealing member is circular in nature and may be an O-ring. The radial groove or recess of the rotor 21 is designed with a width to contact the sealing member or O-ring at or about its cross-sectional outer diameter. This frictional contact will cause the O-ring to rotate with the rotor as the rotor is rotated by the shaft. The stator 14 has a radial groove or cavity with a depth equal to approximately one-half the diameter of the sealing member 20 and a width essentially that of the cross-sectional diameter of the sealing member. Once in position, as is shown best in FIGS. 3, 4, and 5, the rotor and stator are locked together in axial direction by virtue of the fact that the O-ring acts so as to prevent the relative axial movement of rotor and stator. The O-ring in the cavities effectively unites the rotor and stator axially.

In order to obtain this locking action the O-ring seal 20 must be inserted in the cavities or grooves 21 and 22.

Assembly of the isolator is accomplished by positioning the rotor into the stator 14 with its inclined ramp 23. As the rotor is forced into the stator, when the rotor portion is forced into the stator, the O-ring 20 is deformed and forced up into the cavity 21 which is deep enough to accept the full O-ring until the groove 22 is aligned with the groove 21. The O-ring will return to the position shown in FIG. 3, because of having been deformed by the ramp, will now reform and sit in the grooves 21 and 22, which is the natural at-rest situation.

Figure 4:
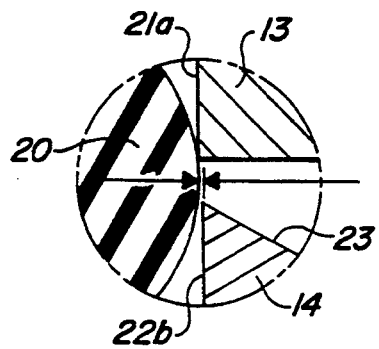
FIG. 4 is an enlarged sectional view of showing the detail of the construction and relative size of the cavities.

As shown more clearly in the details in FIG. 4, there are critical axial dimensions for the grooves with respect to the cross-sectional diameter of the O-ring. The rotor groove axial width is equal to about 99 hundredths (0.99) of the O-ring diameter. This means the side walls 21a do not contact and/or intersect the O-ring 20 at its exact center line but are radially off center. The resulting frictional contact is necessary to rotate the seal member 20 with the rotor 13.

The width of the stator groove or recess shall be approximately equal to the O-ring diameter because the side walls do not intersect with O-ring 20 at its exact center line. A lesser amount of frictional engagement with the O-ring 20 results so that the O-ring 20 will rotate with the rotor 13 and slip within the stator groove 22.

Figure 5:
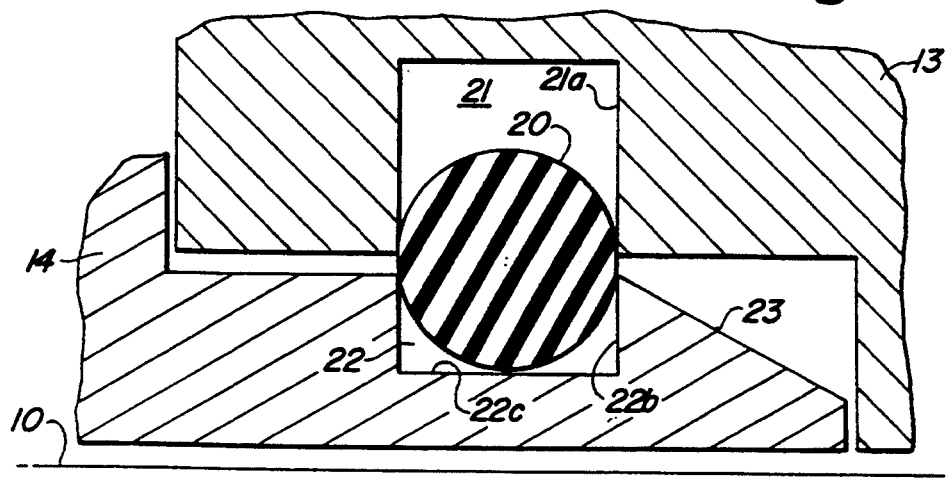
FIG. 5 is a sectional view showing the positioning of the sealing ring in the cavities when the shaft is rotating.

As shown in FIG. 3, the O-ring and the surfaces of the grooves affect a positive seal between the rotor 13 and the stator 14 in a static condition. However, as shown in FIG. 5, the O-ring 20 will tend to stretch and elongate circumferentially as a result of the rotative velocity of the rotor.

The O-ring 20 never becomes entirely disengaged from the stator groove and will always remain within the confines of both grooves. However, the O-ring 20 will, because of the geometric relationship of the circular cross-section of the O-ring and the rectangular configuration of the stator O-ring groove, during rotation, slowly increase the clearance between the circumference of the O-ring and the walls 22b of the groove 22. This movement or frictional disengagement is proportional to the rotational speed of the rotor. Thus, the faster the rotor is rotating, the less friction and the bigger the gap between the inside diameter of the O-ring 20 and the walls 22b and the outside diameter 22c of the groove 22 and the greater frictional engagement with the rotor.

The O-ring is typically made of Viton, nitrile or aflas or any other suitable elastomer.

These fluoro elastomer materials are currently available. Viton is manufactured by Dupont. The seal preferably has a durometer which will permit resilient deformability.

Variations and other aspects of the preferred embodiment will occur to those versed in the art all without departure from the spirit and scope of the invention.

What is claimed:

1. A bearing isolator for sealing a rotating shaft exiting a housing comprising:
    a. a housing;
    b. a shaft extending through said housing; an annular stator member, said stator member includes means for affixing said stator to said housing;
    c. said stator member having a radial cavity in the surface face parallel to said shaft;
    d. an annular rotor member, said rotor member rotatively connected to said shaft and having a radial cavity in the surface face parallel to said shaft;
    e. said rectangular cavity in said stator is of different dimensions than the rectangular cavity in said rotor;
    f. a solid resilient annular elastomeric sealing member;
    g. The width of said rotor cavity shall be slightly less than the diametric cross-section of said elastomeric sealing member;
    h. said parallel surface faces overlapping with said cavities aligned and juxtaposed to form a single cavity;
    i. said solid resilient annular sealing member substantially occupying said single cavity to seal the housing interior from the environment external said housing.

2. A bearing isolator, according to claim 1, wherein said sealing member has a circular cross section.

3. A bearing isolator, according to claim 1, wherein said sealing member is formed of an elastomeric material.

4. A bearing isolator, according to claim 1, wherein said cavities are rectangular in shape and have surface faces parallel and perpendicular to said shaft.

5. A bearing isolator, according to claim 4 wherein the width of the stator cavity shall be axially slightly greater than the cross-sectional diameter of the elastomeric sealing member.

6. A bearing isolator, according to claim 4, wherein the depth of the rotor cavity shall be approximately equal to the natural outside diameter of the elastomeric sealing member.

7. A bearing isolator, in accordance with claim 4, wherein said cavity in said stator shall have a depth equal to approximately one-half the natural diameter of the elastomeric sealing member.

8. A bearing isolator for sealing a rotating shaft exiting a housing comprising:
    a. a housing;
    b. a shaft extending through said housing;
    c. an annular stator member, said stator member including means for affixing said stator member to said housing;
    d. said stator member having a radial cavity therein on a surface face parallel to said shaft;
    e. a circular elastomeric sealing member;
    f. an annular rotor member;
    g. said stator radial cavity having a width slightly greater than the elastomeric sealing member diameter and a depth of said stator radial cavity approximately equal to one-half of the diameter of said sealing member;
    h. said rotor member rotatively connected to said shaft and having a radial cavity on a surface face parallel to said shaft, said rotar radial cavity having a width slightly less than said sealing member outside diameter and a depth approximately equal to the outside diameter of said sealing member;
    i. said cavities aligned and juxtaposed to form a single cavity;
    j. said elastomeric annular sealing member simultaneously occupying substantial portions of said cavities to axially lock the rotor and stator and seal the housing interior from the environment external of said housing.

9. A bearing isolator, according to claim 8, wherein said stator member has a ramp surface extending from the vertical wall of the cavity in the axial direction toward said rotor, whereby said sealing member is inserted in said cavities when said stator and said rotor are axially joined.

10. A bearing isolator, according to claim 8, wherein said stator member has a ramp surface extending from the vertical wall of the cavity in the axial direction toward the said rotor, whereby said resilient seal member is forced into said cavity in said rotor member and inserted in said cavities.

11. A method of sealing a shaft bearing, the shaft rotatively extending from a housing, the method comprising:
- a. fixing a stator on a housing concentrically about the shaft;
- b. mounting a rotor sealed on the shaft in close relation to the housing for rotation with the shaft;
- c. The stator and rotor having overlapping radially spaced cylindrical surfaces;
- d. a cavity in the cylindrical surface of said rotor and a cavity in the cylindrical surface of said stator;
- e. said cavities designed to be aligned and juxtaposed to form a single cavity when said stator and said rotor are positioned on said shaft;
- f. forcing a solid resilient annular elastomeric seal member first into said rotor member cavity and then into the juxtaposed cavities by axial insertion of the rotor member into the stator member so that the sealing member always occupies space in both cavities and acts as a positive seal at rest between the rotor and stator surfaces while preventing axial, relative movement between said rotor with respect to said stator.

12. The method of claim 11 including the step of forcing said sealing member into contact with the sides of said cavity in said rotor whereby said seal member rotates with said rotor member the centrifugal force created by said rotation reduces the rotational friction of the sealing member relative to said stator cavity, whereby said seal member continues to act as a seal and positively prevents relative axial movement between the rotor and the stator.

* * * * *